United States Patent
Thor et al.

(10) Patent No.: US 7,977,623 B2
(45) Date of Patent: Jul. 12, 2011

(54) OPTICAL ENCODER WITH CODE WHEEL MISALIGNMENT DETECTION AND AUTOMATIC GAIN CONTROL

(75) Inventors: Chung Min Thor, Penang (MY); Mei Yee Ng, Perak (MY); Gim Eng Chew, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/727,980

(22) Filed: Mar. 19, 2010

(65) Prior Publication Data

US 2010/0252719 A1    Oct. 7, 2010

Related U.S. Application Data

(62) Division of application No. 12/112,962, filed on Apr. 30, 2008, now Pat. No. 7,709,784.

(51) Int. Cl.
*G01D 5/34* (2006.01)
(52) U.S. Cl. .................... 250/231.13; 250/221
(58) Field of Classification Search ............. 250/231.13, 250/231.16, 239, 221, 214 R, 559.3; 341/11, 341/13
See application file for complete search history.

(56) References Cited

U.S. PATENT DOCUMENTS

| | | | |
|---|---|---|---|
| 4,223,261 A | 9/1980 | White | |
| 4,593,194 A | 6/1986 | Graham et al. | |
| 4,649,267 A * | 3/1987 | Ray | 250/205 |
| 4,998,013 A | 3/1991 | Epstein et al. | |
| 5,260,568 A | 11/1993 | Ieki | |
| 5,629,550 A | 5/1997 | Mita et al. | |
| 6,154,278 A | 11/2000 | Ito et al. | |
| 6,229,140 B1 | 5/2001 | Ishizuka | |
| 6,345,074 B1 | 2/2002 | Turk et al. | |
| 6,563,108 B1 | 5/2003 | Stevens et al. | |
| 6,598,196 B1 | 7/2003 | Bussard et al. | |
| 6,885,457 B1 | 4/2005 | Michel et al. | |
| 7,244,928 B2 | 7/2007 | Ng et al. | |
| 7,348,544 B2 | 3/2008 | Atsuta et al. | |
| 2004/0172208 A1 | 9/2004 | Freitag et al. | |
| 2007/0138382 A1 | 6/2007 | Matsuyama | |

OTHER PUBLICATIONS

Agilent Technologies, "Quick Assembly Two and Three Channel Optical Encoders", *Technical Data HEDM-550x/560x,HEDS-550x/554x,and HEDS-560x/564x* May 4, 2001.

OPTOLAB Microsystems, "Specifications ASI", www.optolab.com Dec. 18, 2002.

* cited by examiner

*Primary Examiner* — Que T Le

(57) ABSTRACT

According to one embodiment, there is provided a device and method for correcting code wheel misalignment which employs upper and lower code wheel misalignment photodetectors positioned above and below at least first and second motion detection photodetectors. According to other embodiments, there are provided a device and method for automatically setting the gain of an output circuit in an optical encoder. Still further embodiments of optical encoders combine the code wheel misalignment and automatic gain control features of the invention.

5 Claims, 5 Drawing Sheets

OPTICAL ENCODER WITH CODE WHEEL MISALIGNMENT DETECTION AND AUTOMATIC GAIN CONTROL

CROSS REFERENCE TO RELATED APPLICATION

This application is a divisional application, which is based on, and claims priority to, U.S. Pat. No. 7,709,784 (Utility patent application Ser. No. 12/112,962) filed on Apr. 30, 2008 entitled "Optical Encoder with Code Wheel Misalignment Correction and Automatic Gain Control" to Thor et al, and which is incorporated herein by reference in its entirety.

RELATED APPLICATION

This application incorporates by reference, in its entirety, U.S. Pat. No. 7,732,754 (Utility patent application Ser. No. 12/112,867) filed Apr. 30, 2008 entitled "Optical Encoder with Amplitude Correction" to Toh et al.

FIELD OF THE INVENTION

Various embodiments of the invention described herein relate to the field of optical encoders, and components, devices, systems and methods associated therewith.

BACKGROUND

Most motion detection or position optical encoders of the prior art comprise four photodiode channels, typically labelled namely A, A/, B and B/, respectively. Such optical encoders work by generating photocurrent using these channels, and are usually spatially arranged in the encoder such that they are 90 degrees out of phase apart with respect to one another. It is imperative that the code wheel of the encoder and the photodiodes be aligned properly and accurately in respect of one another. Otherwise, inaccuracies and errors result in the photocurrents produced by such channels, which lead to inaccurate position or motion information being generated by the encoder. Currently, no method or device exists to detect code wheel misalignment using photodiodes incorporated into an encoder integrated circuit (or "IC").

In addition, most motion detection or position optical encoders of the prior art are designed and fabricated using well known bipolar processes, which enable photocurrent contrast to be obtained using the log-antilog architecture inherent in most BJT devices. However, with the advent of CMOS processes, encoder designs are being adapted to MOS devices for better scalability, lower cost and lower power. CMOS processes, however, are typically not amenable to the log-antilog architecture often employed in bipolar devices. As a result, more straightforward and conventional transimpedance amplification circuitry must be employed in CMOS processes. But to amplify photocurrents to reasonable voltage output levels, a resistor of the correct value must be used, which is a difficult proposition to implement in CMOS devices employing conventional transimpedance amplification circuits.

What is needed is a device and method for detecting code wheel misalignment using photodiodes incorporated, for example, into an encoder IC. What is also needed is a device and method for setting the gain of a transimpedance amplifier automatically, which depends on the input light power and the photocurrent generated.

SUMMARY

In some embodiments, there is provided an optical encoder comprising a light emitter configured to emit a collimated beam of light, a code wheel having a plurality of apertures disposed therethrough and configured to rotate substantially in a plane and in a first direction, a light detector comprising at least first and second photodetectors positioned along the first direction on a first vertical portion thereof and at least upper and lower code wheel misalignment photodetectors positioned on second and third vertical portions thereof disposed, respectively, above and below the first and second photodetectors, and a code wheel misalignment circuit, where the light detector faces the light emitter, the code wheel is disposed and configured to rotate between the light emitter and the light detector such that the collimated light beam is directed substantially in the plane through the apertures onto the first, second and third vertical portions as the wheel rotates, the first and second photodetectors are configured to generate, in response to first portions of the collimated beam being incident thereon, first and second output signals, and the upper and lower code wheel misalignment photodetectors are configured to generate, in response to second and third portions of the collimated beam being incident thereon, third and fourth output signals provided to the code wheel misalignment circuit, the circuit being configured to detect a difference between the amplitudes of the third and fourth output signals, the circuit generating an error signal indicative of a code wheel misalignment when the difference exceeds a predetermined threshold.

In another embodiment, there is provided a method of generating an error signal indicative of code wheel misalignment in an optical encoder comprising providing a light emitter configured to emit a collimated beam of light, providing a code wheel having a plurality of apertures disposed therethrough and configured to rotate substantially in a plane and in a first direction, providing a light detector comprising at least first and second photodetectors positioned along the first direction on a first vertical portion thereof and at least upper and lower code wheel misalignment photodetectors positioned on second and third vertical portions thereof disposed, respectively, above and below the first and second photodetectors, and providing a code wheel misalignment circuit, rotating the code wheel between the light emitter and the light detector such that the collimated light beam is directed substantially in the plane through the apertures onto the first, second and third vertical portions, generating with the first and second photodetectors, respectively, first and second output signals in response to first portions of the collimated beam being incident thereon, generating with the upper and lower code wheel misalignment photodetectors, respectively, third and fourth output signals in response to second and third portions of the collimated beam being incident thereon, and detecting a difference in amplitudes of the third and fourth output signals that exceeds a predetermined threshold and is indicative of a misalignment of the code wheel.

In a further embodiment, there is provided an optical encoder comprising a light emitter configured to emit a collimated beam of light, a code wheel having a plurality of apertures disposed therethrough and configured to rotate substantially in a plane and in a first direction, a light detector comprising at least first and second photodetectors positioned along the first direction on a first vertical portion thereof and at least a first automatic gain control photodetector positioned on a second vertical portion thereof, the second vertical portion being vertically offset from the first vertical portion, and an automatic gain control circuit comprising a comparator and a decoder, where the light detector faces the light emitter, the code wheel is disposed and configured to rotate between the light-emitting element and the light detector such that the collimated light beam is directed substantially in the plane through the apertures onto the first and second vertical portions as the wheel rotates, the first and second photodetectors are configured to generate, in response to first portions of the collimated beam being incident thereon, first and second output signals, and the first automatic gain control photodetector is configured to generate, in response to the second portion of the collimated beam being incident thereon, a third output signal provided to the circuit, the circuit being configured to receive the third output signal and compare same to a reference voltage using the comparator, an output of the comparator being provided to a decoder which sets the gain of the automatic gain circuit according to the comparator output.

In yet a further embodiment, there is provided a method of providing automatic gain control in an optical encoder comprising providing a light emitter configured to emit a collimated beam of light, providing a code wheel having a plurality of apertures disposed therethrough and configured to rotate substantially in a plane and in a first direction, providing a light detector comprising at least first and second photodetectors positioned along the first direction on a first vertical portion thereof and at least a first automatic gain control photodetector positioned on a second vertical portion thereof, the second vertical portion being vertically offset from the first vertical portion, and providing an automatic gain control circuit comprising a comparator and a decoder, rotating the code wheel between the light-emitting element and the light detector such that the collimated light beam is directed substantially in the plane through the apertures onto the first and second vertical portions, generating with the first and second photodetectors, in response to first portions of the collimated beam being incident thereon, first and second output signals, generating with the first automatic gain control photodetector, in response to the second portion of the collimated beam being incident thereon, a third output signal and providing same to the circuit, comparing the third output signal and a reference voltage in the comparator and generating an output from the comparator on the basis of such comparison, and providing the comparator output to a decoder and setting the gain of the automatic gain circuit according to the comparator output.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIG. 1C shows a modified view of FIG. 1B, wherein code wheel 20 is misaligned with respect to light detector 40, thereby preventing light from being incident upon upper code wheel misalignment photodetector 90a;

FIG. 3 shows one embodiment of a light detector 40 of the invention having a single automatic gain control photodetector 90a;

The drawings are not necessarily to scale. Like numbers refer to like parts or steps throughout the drawings, unless otherwise noted.

DETAILED DESCRIPTIONS OF SOME PREFERRED EMBODIMENTS

According to various embodiments, there are provided a device and method for correcting code wheel misalignment which employs upper and lower code wheel misalignment photodetectors positioned above and below at least first and second motion detection photodetectors. According to other embodiments, there are provided a device and method for automatically setting the gain of an output circuit in an optical encoder. Still further embodiments combine the code wheel misalignment and automatic gain control features of the invention in an optical encoder.

Figure 1A:
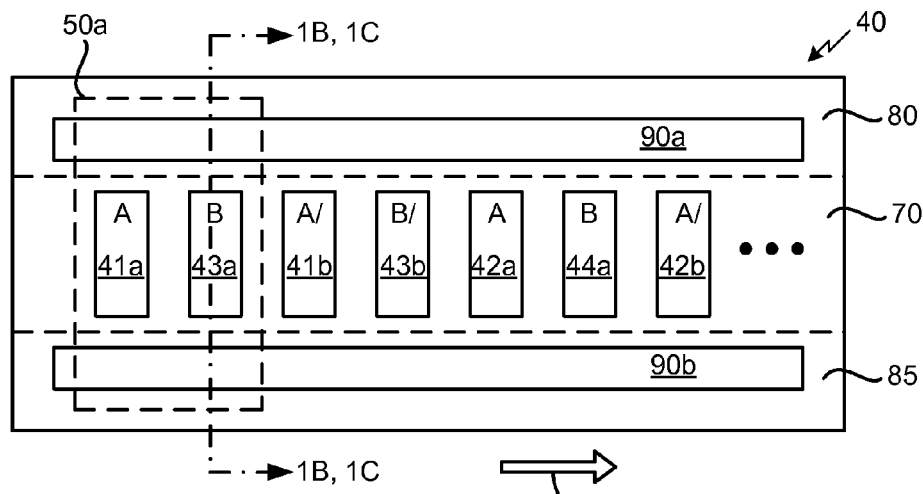
FIG. 1A shows one embodiment of a light detector 40 of the invention having code wheel misalignment detection capabilities.
Figure 1B:
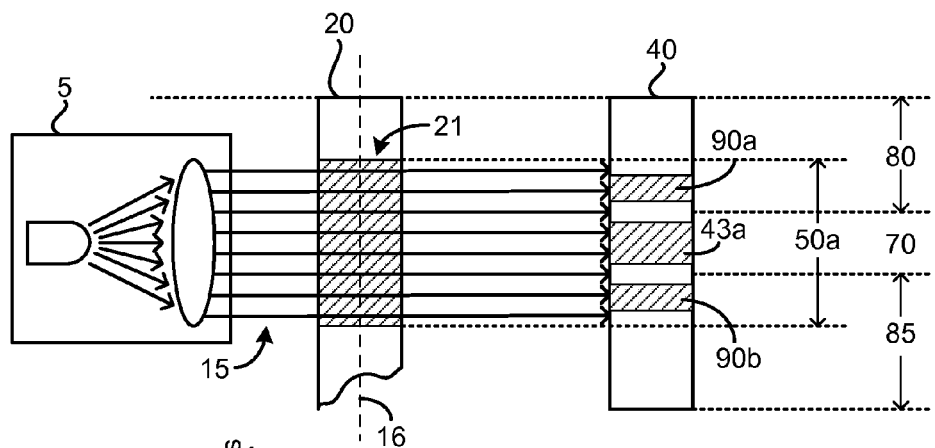
FIG. 1B shows a cross-sectional view of light detector 40 of FIG. 1A, together with a light emitter 5 and a code wheel 20, wherein code wheel 20 is properly aligned with respect to light detector 40.
Figure 1C:
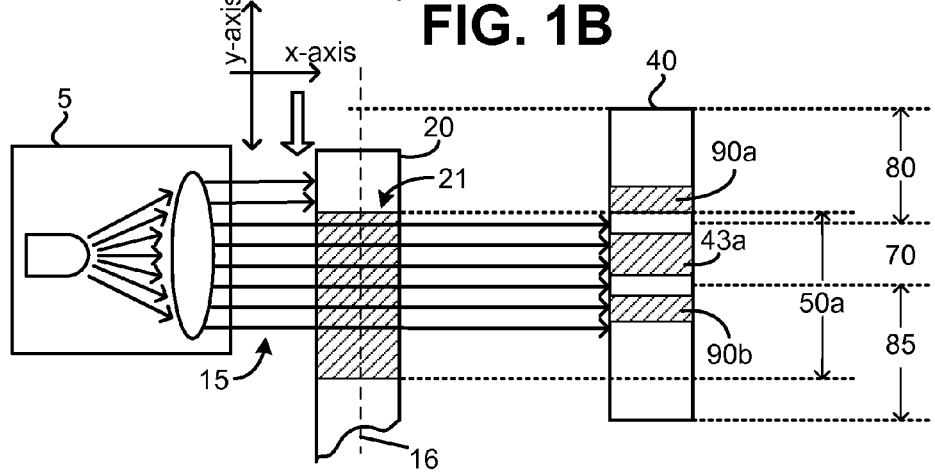

According to one embodiment shown in FIGS. 1A, 1B and 1C, there is provided an optical encoder comprising a light emitter 5 configured to emit a collimated beam of light 15; a code wheel 20 having a plurality of apertures (e.g. 21) disposed therethrough and configured to rotate substantially in a plane 16 and in a first direction 110; and a light detector 40 comprising at least first and second photodetectors 41a (A) and 43a (B) positioned along first direction 110 on a first vertical portion 70 thereof. At least upper and lower code wheel misalignment photodetectors 90a and 90b are positioned on second and third vertical portions 80 and 85 disposed, respectively, above and below first and second motion detection photodetectors 41a and 43a. The light detector 40 faces the light emitter, and the code wheel is disposed and configured to rotate between the light emitter and the light detector such that the collimated light beam is directed through the apertures onto the first, second and third vertical portions 70, 80 and 85, respectively. As the code wheel rotates, first and second photodetectors 41a and 43a are configured to generate, in response to illumination area 50a of the collimated beam, first and second output signals. Upper and lower code wheel misalignment photodetectors 90a and 90b are configured to generate, in response to respective portions of the collimated beam being incident thereon, third and fourth output signals, which are provided to a code wheel misalignment circuit (120 of FIG. 2). The circuit 120 is configured to detect a difference between the amplitudes of the third and fourth output signals, and generate an error signal indicative of code wheel misalignment when the difference exceeds a predetermined threshold.

Continuing to refer to FIGS. 1A, 1B and 1C, note that additional motion detection photodetectors such as photodetectors 41b (A/), 43b (B/), 42a (A), 44a (B) and 42b (A/) may also be included in photodetector 40.

In a preferred embodiment of the invention, the surface areas of upper and lower code wheel misalignment photodetectors 90a and 90b are equal or substantially equal. If the surface areas corresponding to upper and lower code wheel misalignment photodetectors 90a and 90b are equal or substantially equal, and these substantially equal surface areas are exposed to substantially equal amounts of incident light (as shown in FIG. 1B, where code wheel 20 is properly aligned with respect to light detector 40) then the photocurrents (third and fourth output signals) delivered by photodetectors 90a and 90b will also be the same. On the other hand, if these substantially equal surface areas are exposed to unequal amounts of incident light (as shown in FIG. 1C, where code wheel 20 is misaligned with respect to light detector 40 thereby blocking light from being incident on upper photodetector 90a), then the photocurrents (third and fourth output signals) delivered by the two photodetectors 90a and 90b will not be equal to each other.

The photocurrents delivered by the two photodetectors 90a and 90b are preferably converted into voltage signals using transimpedance amplifiers 122a and 122 b (shown in FIG. 2), since voltage comparisons may be carried out more easily in devices made according to conventional CMOS processes. The output voltages from these two code wheel misalignment channels may then be compared using a comparator 124 (shown in FIG. 2) having a hysteresis value with a set margin. When the difference between the two signals delivered by the code wheel misalignment channels exceeds the margin (as a result of code wheel misalignment, such as shown in FIG. 1C), an error signal is generated that is indicative of the code wheel and photodiode channels being misaligned in respect of the vertical direction or y-axis. Note that more than two photodetectors 90a and 90b may be employed to detect code wheel misalignment.

Figure 2:
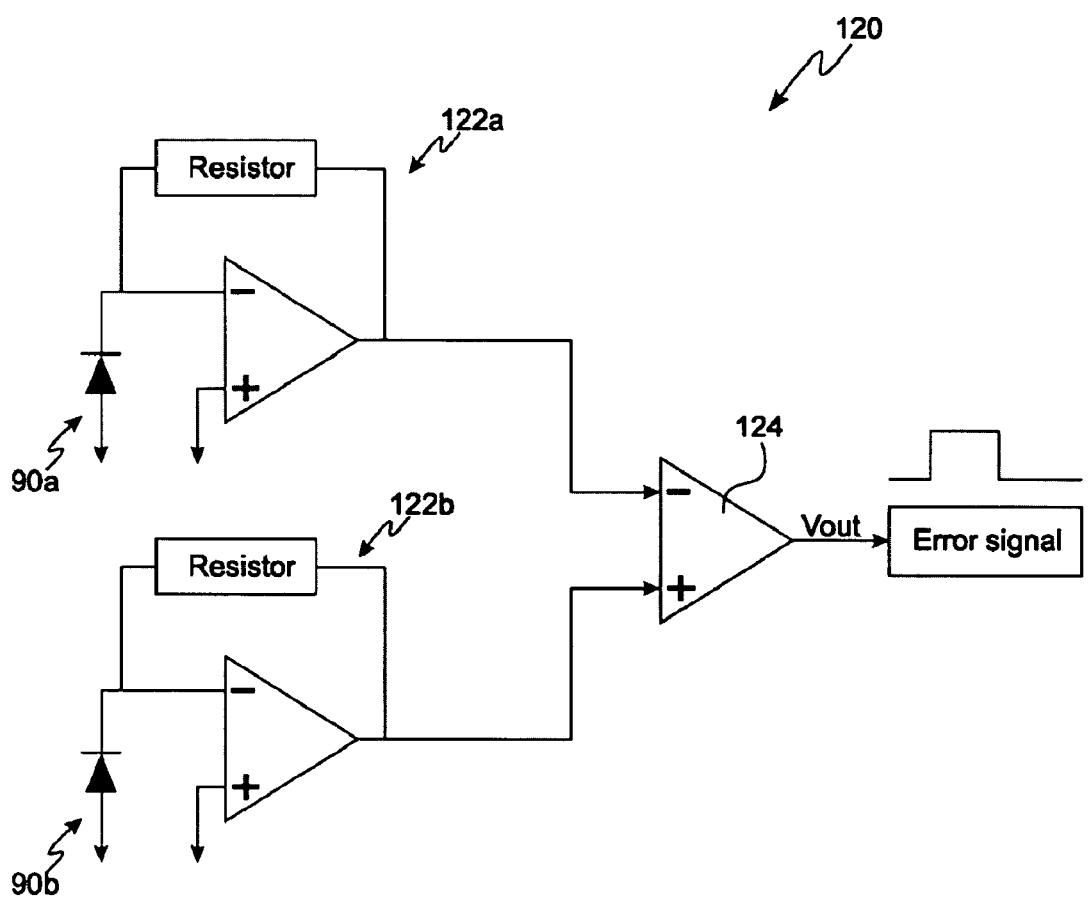
FIG. 2 shows one embodiment of a circuit 120 of the invention corresponding to the light detector 40 of FIG. 1.

FIG. 2 shows a block diagram according to one embodiment of circuit 120 adapted to receive and process output signals generated by upper and lower code wheel misalignment photodetectors 90a and 90b. As shown, circuit 120 comprises upper and lower code wheel misalignment photodetectors 90a and 90b, transimpedance amplifiers 122a and 122b operably connected to photodetectors 90a and 90b, and comparator 124 configured to provide an output error signal indicative of code wheel misalignment when the differences between the signals provided by amplifiers 122a and 122b to comparator 124 exceed a predetermined threshold. To compensate for minor differences in the amplitudes of the output signals provided by photodetectors 90a and 90b that arise from such influences as amplifier offsets, device imperfections, dust or ink mist, the hysteresis of comparator 124 may be designed into comparator 124, or may be adjusted or set during operation. The value of the hysteresis should be small and in the range of tens of millivolts to about 100 mV. When the difference in amplitudes provided by amplifiers 122a and 122b exceeds such a value, the error signal should be generated.

In another embodiment, and as illustrated in FIGS. 3 through 6, there are provided devices and methods for implementing automatic gain control (AGC) in an optical encoder, where an average light input is measured. Three different embodiments of such devices and methods are illustrated herein, wherein at least one extra or additional automatic gain control photodiode is employed in light detector 40 to sense average light input and thereby average out the photocurrent measured through one or more apertures in a code wheel.

Figure 3:
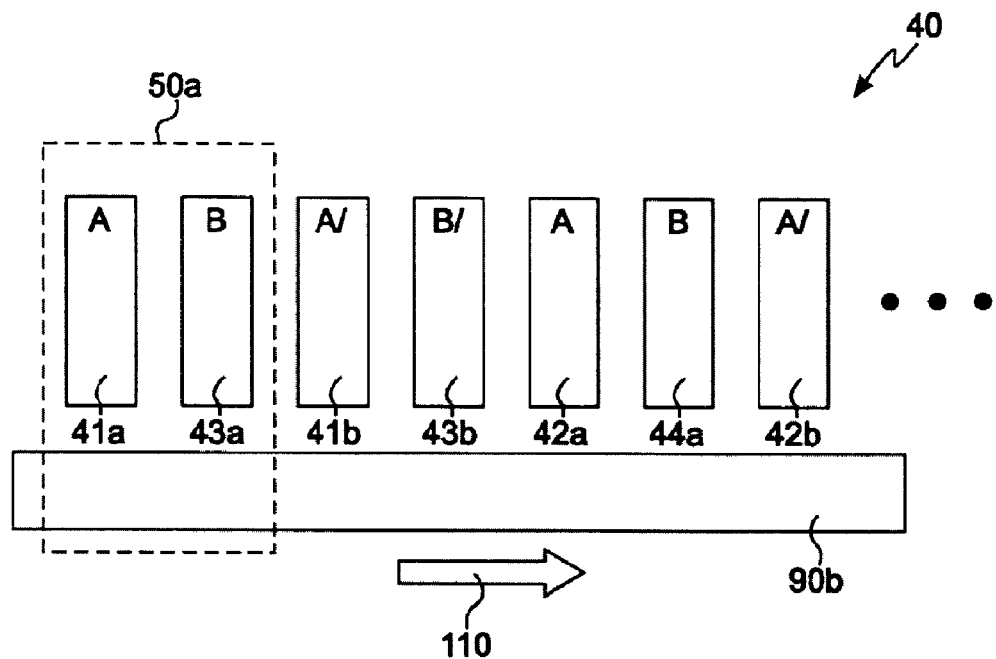
Figure 4:
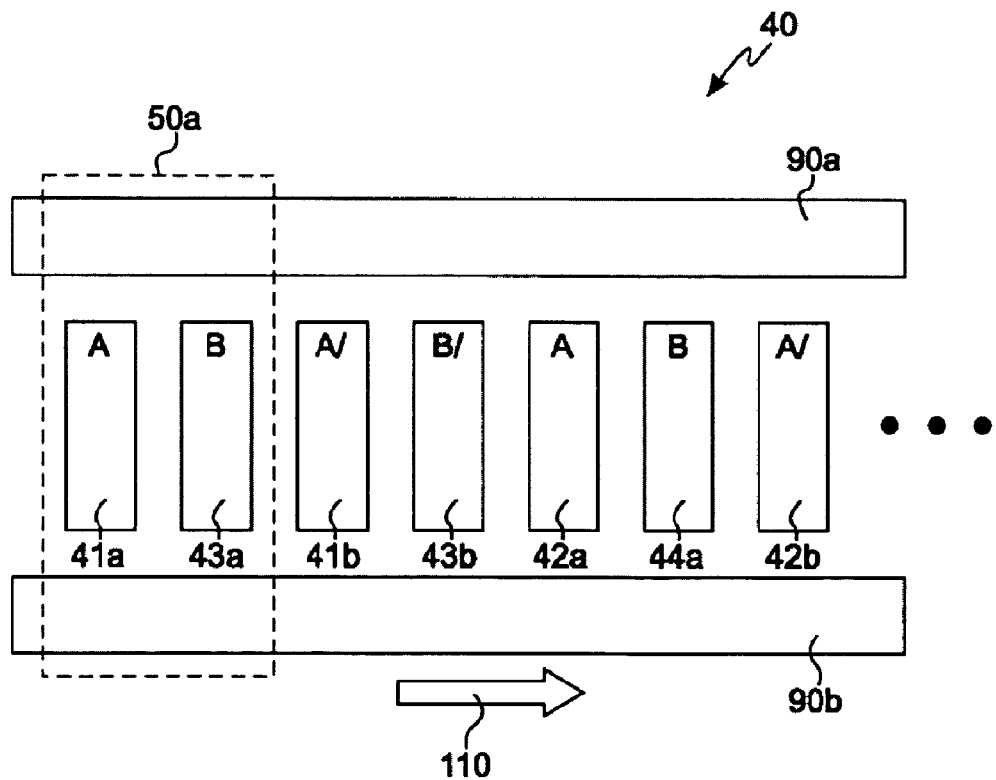
FIG. 4 shows one embodiment of a light detector 40 of the invention having dual automatic gain control photodetectors 90a and 90b.
Figure 5:
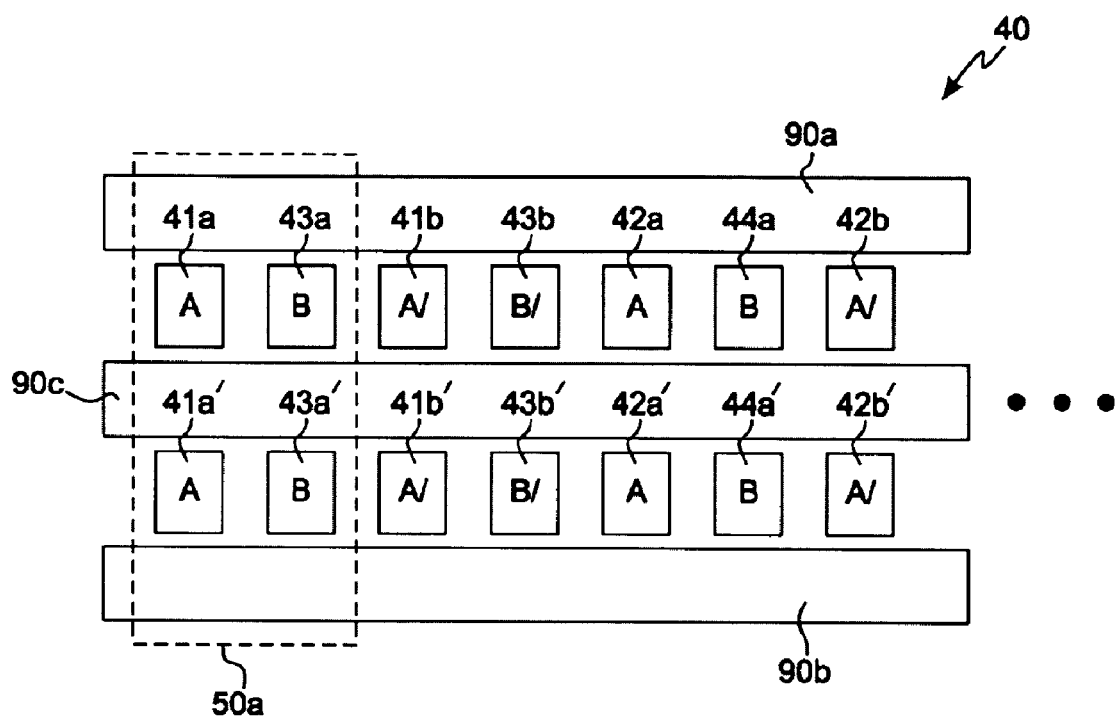
FIG. 5 shows one embodiment of a light detector 40 of the invention having triple automatic gain control photodetectors 90a, 90b and 90c.

FIG. 3 shows a first such device containing a single automatic gain control photodiode 90b, where automatic gain control photodiode 90b is placed beneath and vertically offset from motion detection photodiodes 41a (A), 43a (B), 41b (A/), 43b (B/), 42a (A), 44a (B) and 42b (A/). FIG. 4 depicts a second such device, where automatic gain control photodiodes 90a and 90b are placed beneath and vertically offset from motion detection photodiodes 41a (A), 43a (B), 41b (A/), 43b (B/), 42a (A), 44a (B) and 42b (A/). FIG. 5 illustrates a third such device, where automatic gain control photodiodes 90a and 90b are placed beneath and vertically offset from first row of motion detection photodiodes 41a (A), 43a (B), 41b (A/), 43b (B/), 42a (A), 44a (B) and 42b (A/), and second row of motion detection photodiodes 41a' (A), 43a' (B), 41b' (A/), 43b' (B/), 42a' (A), 44a' (B) and 42b' (A/), and automatic gain control photodiode 90c is placed between such first and second rows of motion detection photodiodes. Those skilled in the art will understand that many other permutations, combinations and configurations of automatic gain control photodiodes and motion control photodiodes may also be employed and nevertheless fall within the scope of the invention. The greater the number of automatic gain control photodiodes employed, the increased sensitivity light detector 40 will feature and the less sensitivity there will be from light source variation or photodiode contamination.

Figure 6:
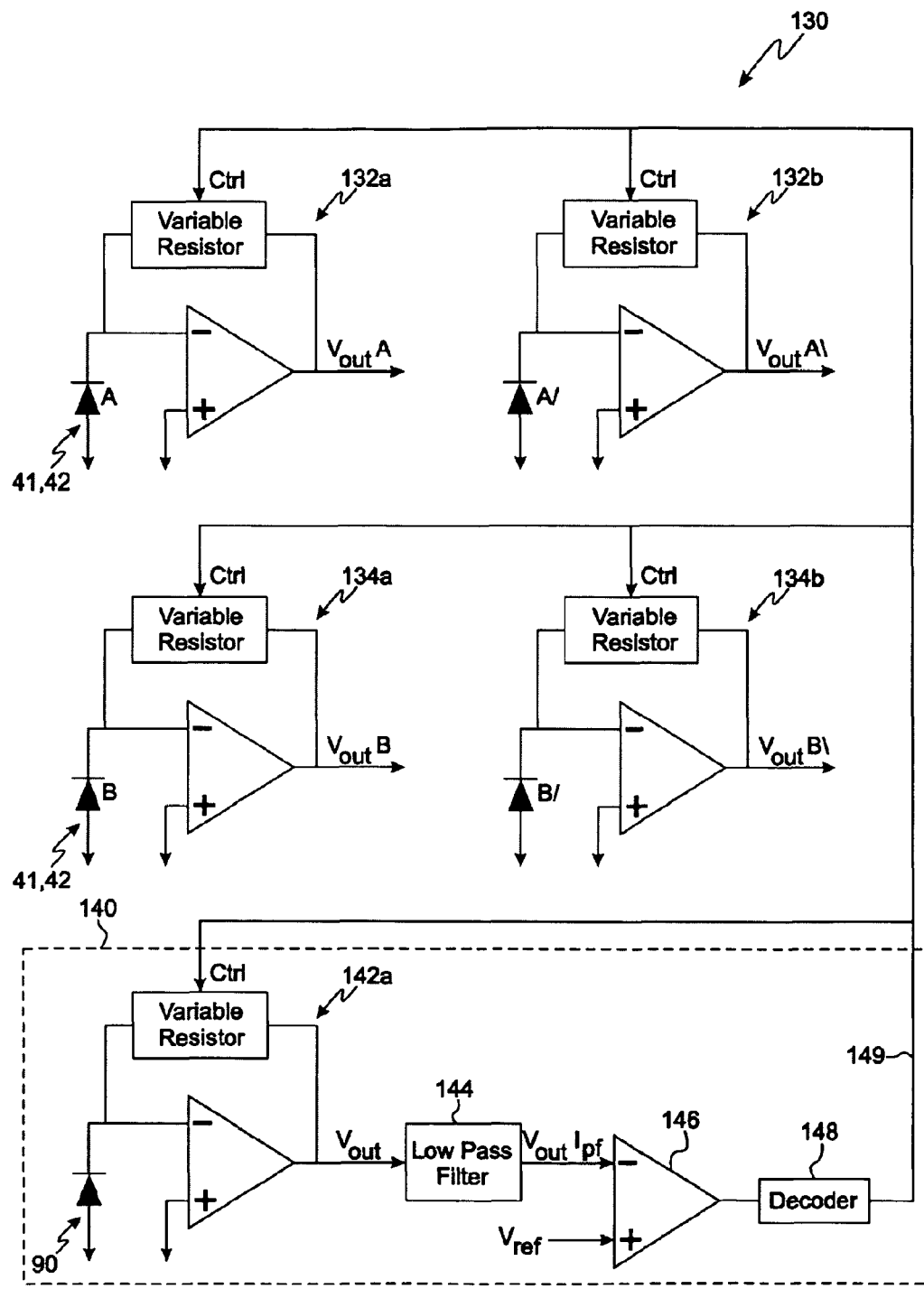
FIG. 6 shows a block diagram according to one embodiment of circuit 130 of the invention.

FIG. 6 shows one embodiment of a block diagram of an automatic gain control circuit 130 in an optical encoder using the above-described automatic gain control photodiodes. Circuit 130 comprises automatic gain control photodiode 90, transimpedance amplifiers 132a, 134a and 142a, low pass filter 144, comparator 146, decoder 148 and variable resistors associated with each of transimpedance amplifiers 132a, 134a and 142a. Referring additionally to FIGS. 3 through 5, it will be seen that the spatial positions of automatic gain control photodiodes 90a, 90b and 90c in light detectors 40 yield average photocurrents output therefrom that vary little over time owing to such photodiodes having fixed surface areas exposed to light beam portion 50a. The relatively constant photocurrents generated by automatic gain control photodiodes 90a, 90b and 90c are inputs to comparator 146, and are compared against desired reference voltage $V_{ref}$. The result of such comparison is passed to decoder 148, which then determines the level of gain to apply. In such a feedback system, the gain of circuit 130 is adjusted until the output signal $V_{out}$ is substantially the same as the desired reference voltage $V_{ref}$.

Continuing to refer to FIG. 6, transimpedance amplifier 142a converts the photocurrent(s) delivered by automatic gain control photodiodes 90a, 90b and/or 90c into a voltage signal $V_{out}$, which is passed to low pass filter 144 to filter out undesired AC components. The remaining filtered signal ($V_{out}\_I_{pf}$) represents an average DC value of the photocurrent measured by automatic gain control photodiodes 90a, 90b and/or 90c multiplied by a factor set by the feedback resistor. $V_{out}\_I_{pf}$ is compared against reference voltage desired $V_{ref}$, which is set according to the particular application and manufacturing process at hand. The output of comparator 146 is sent to decoder 148, which determines the gain to use in adjusting $V_{out}\_I_{pf}$ to be as close as possible to $V_{ref}$. The same gain is applied to each of channels A, B, A/ and B/ so that the output voltages provided by these channels match those of $V_{ref}$.

To make optimal use of this invention, there should be a known and established relationship between the photocurrents delivered by channels A, B, A/and B/ on the one hand, and those delivered by automatic gain control photodiodes 90a, 90b and/or 90c on the other hand. As alluded to above, automatic gain control photodiodes 90a, 90b and/or 90c measure an average current corresponding essentially to all the motion detection photodiode channels, which receive fluctuating amounts of light as light beam portion 50a scans thereover. For example, if the photocurrent from Channel A is designed to have 5 times the photocurrent delivered by automatic gain control photodiode 90a, then the feedback gain of Channel A will be one fifth the gain applied to automatic gain control photodiode 90a. Assuming all motion detection channels have the same surface areas exposed to light beam portion 50a and the same responsiveness, then such a method will ensure that the voltage swings of all the motion detection photodiode channels stay at a desired reference voltage using only a single additional automatic gain control photodiode 90a.

Note that according to one embodiment only one automatic gain control photodiode 90a, 90b or 90c is required to provide automatic gain control correction and feedback. Note further that only one pair of motion detection photodiodes 41a and 41b is required in optical encoder 10 of the invention. The use of additional reference and motion detection photodetectors or photodiodes in light detector 40 adds to the accuracy and efficacy of optical encoder 10 of the invention however.

It will now become apparent to those skilled in the art that the various embodiments of the invention disclosed herein provide several advantages, including, but not limited to providing optical encoders having enhanced ability to detect code wheel misalignment and improved automatic gain control of the output signals provided by an optical encoder. Those skilled in the art will also appreciate that various embodiments of the invention are efficacious in detecting misalignment of a code wheel and providing position information of increased accuracy from an optical encoder or optical encoder incorporated into an IC.

Moreover, the various embodiments of the invention are amenable and well adapted for use in standard CMOS manufacturing processes, are simple and easy to implement, determine whether a code wheel is misaligned in respect of motion detection photodiodes, regulate output voltage swings resulting from photodiode input currents, provide a position sensing method which remains robust despite varying emitter/detector distances, provide a position sensing method which is fairly insensitive to output voltage degradation and part-to-part variation, provide a position sensing method which minimizes variations between parts and in photodiode current, can regulate signal levels over wide ranges, are essentially independent of motion detector photodiode signal variation, and solve problems arising from the presence of contaminants such as dust, ink mist, and the like.

Note that the terms "vertical" and "horizontal" employed herein are intended to refer to the relative orientations of light detector 40 and the various photodiodes arranged thereon as they relate spatially to one another and to the code wheel and light emitter. Note further that various types of photodetectors known in the art may be employed in the invention, in addition to photodiodes.

Note further that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A method of providing automatic gain control in an optical encoder, comprising:
   providing a light emitter configured to emit a collimated beam of light;
   providing a code wheel having a plurality of apertures disposed therethrough and configured to rotate substantially in a plane and in a first direction;
   providing a light detector comprising at least first and second photodetectors positioned along the first direction on a first vertical portion thereof and at least a first automatic gain control photodetector positioned on a second vertical portion thereof, the second vertical portion being vertically offset from the first vertical portion;
   providing an automatic gain control circuit comprising a comparator and a decoder;
   rotating the code wheel between the light-emitting element and the light detector such that the collimated light beam is directed substantially in the plane through the apertures onto the first and second vertical portions;
   generating with the first and second photodetectors, in response to first portions of the collimated beam being incident thereon, first and second output signals;
   generating with the first automatic gain control photodetector, in response to the second portion of the collimated beam being incident thereon, a third output signal and providing same to the circuit;
   comparing the third output signal and a reference voltage in the comparator and generating an output from the comparator on the basis of such comparison, and
   providing the comparator output to a decoder and setting the gain of the automatic gain circuit according to the comparator output.

2. The method of claim 1, further comprising providing a second automatic gain control photodetector positioned on a third vertical portion of the light detector vertically offset from the first and second vertical portions and configured to generate, in response to the third portion of the collimated beam being incident thereon, a fourth output signal.

3. The method of claim 2, further comprising providing the fourth output to the circuit and comparing same to the reference voltage using the comparator.

4. The method of claim 1, further comprising providing a third automatic gain control photodetector positioned on a fourth vertical portion of the light detector vertically offset from the first, second and third vertical portions and configured to generate, in response to the fourth portion of the collimated beam being incident thereon, a fifth output signal.

5. The method of claim 4, further comprising providing the fifth output to the circuit and comparing same to the reference voltage using the comparator.

* * * * *